Patented June 7, 1949

2,472,411

UNITED STATES PATENT OFFICE 2,472,411

METHOD FOR ALKYLATING PHENOLIC HYDROXYL GROUP CONTAINING ALKALOIDS AND THE RESULTING PRODUCTS

Karl Folkers, Plainfield, and Frank R. Koniuszy, Roselle Park, N. J., assignors to Merck & Co., Inc., Rahway, N. J., a corporation of New Jersey No Drawing. Application November 2, 1943, Serial No. 508,756

14 Claims. (Cl. 260—236)

This invention relates to alkoxy derivatives of alkaloids, and to processes for their production.

Generally speaking, the selective alkylation of phenolic hydroxyl groups in alkaloids, to produce the corresponding ethers, presents difficulties, in that the complication arises that the nitrogen atom is also reacted upon by the alkylating agent.

Thus, the methylation of morphine with dimethyl sulfate and sodium hydroxide results in the production of methyl morphine methosulfate (Pschoor and Dickhäuser, Ber. 44, p. 2633, 1911; Riedel, A. G. D. R. P. 261,588; Frdländer II, 989). In an attempt to circumvent this difficulty, Rodionov (Bull. Soc. Chim. 39, p. 305, 1926) prepared phenyl trimethyl ammonium hydroxide in alcohol, and reacted it with morphine at 110° C. The Rodionov method, including several modifications, has not been found successful for the methylation of other alkaloids, such as the Erythrina alkaloids, for example.

It has also been suggested (Fuson, Corse & Horning, Jr. Am. Chem. Soc. 61, p. 1290, 1939), to utilize tetramethyl ammonium hydroxide as a methylation agent for sterically hindered acids, but that method also is not suitable for application to all alkaloids.

We have now discovered that alkyl ethers of alkaloids such as the methyl and ethyl ethers may be successfully and selectively produced, if precautions are taken to prevent side reactions, that is, the formation of a quaternary salt.

Briefly stated, our invention contemplates conversion of the selected alkaloid to an amine oxide, prior to treatment thereof with the alkylating agent, reaction of the oxidation product with a dialkyl sulfate, such as dimethyl or diethyl sulfate, for example, reduction of the amine oxide, and recovery of the alkoxy-alkaloid.

According to our invention, the selected alkaloid is treated with an oxidizing agent, such as hydrogen peroxide, or perbenzoic acid, for example, for the production of the corresponding amine oxide. Excess oxidizing agent may be removed at this point, or the oxidation product may be directly reacted with the dialkyl sulfate, in alkaline medium.

The alkylated alkaloid is soluble in water-immiscible organic solvents, and, therefore, it is advisable to extract it from the solution by treating the same with such an immiscible organic solvent, such as chloroform, or the like. The solvent extract is then concentrated to dryness, and the amine oxide group is reduced, preferably in dilute acid solution containing zinc dust.

Alternatively, the chloroform extract of the alkylation product may be extracted with dilute acid, and zinc dust added to the dilute acid solution thus obtained. After reduction of the oxide group is complete, the reduction solution is filtered to remove zinc, and alkalinized. Alkalinizing agents such as ammonium hydroxide, sodium carbonate, etc., are suitable for this purpose.

Within the scope of our invention, and as a further embodiment thereof, we have found that the above-described procedures may be modified, so that the reduction solution is alkalinized directly, without prior filtration, in which case, subsequent to the alkalinization, the solution is filtered, and the precipitated zinc salt, such as zinc carbonate, zinc hydroxide, etc., is removed. Exhaustive extraction of the zinc salt with an organic water-immiscible solvent, usually results in an increased yield of the desired end product.

However arrived at, the zinc-free alkalinized solution is extracted with an organic water-immiscible solvent, and the extract is concentrated to dryness. The residue contains the crude alkoxy-alkaloid, which is desirably recovered in the form of a pure, crystalline derivative by treatment of the residue with an acidulating agent. Thus, for instance, the pure, crystalline picrate may be recovered by treating the water-immiscible organic solvent residue with picric acid. The pure crystalline alkaloid itself may be recovered from the salt.

The reduction of the alkaloidal amine oxide by means of zinc dust and dilute acid does not affect the alkaloid structure.

The following examples illustrate methods of carrying out the present invention, as applied to certain alkaloids of Erythrina. However, it is to be understood that these examples are given by way of illustration and not of limitation, and that the process of our invention is applicable to alkaloids generally, where it is desired to selectively alkylate the phenolic hydroxyl groups thereof.

Example I

Two gms. of erysodine ($C_{18}H_{21}NO_3$: M. P. 202–205° C.; Jr. Amer. Chem. Soc. 62, 1680, 1940), were heated with 20 ml. of 30% hydrogen peroxide for one hour; all of the alkaloid was dissolved. The solution was concentrated to dryness at 30° C. bath and 18 mm. pressure. The residue was dissolved in 50 ml. of 2% sodium hydroxide and five mls. of dimethyl sulfate were added. After shaking for one hour, the mixture was acid to litmus; 15 mls. of 2% sodium hydroxide were added to insure alkalinity, and shaking was continued for 30 mins. longer. The alkaline solution was extracted six times with 50 mls. portions of chloroform, and the chloroform extracts were concentrated to dryness. The residue (1.3 gms.) was dissolved in 50 mls. of dilute hydrochloric acid, and 5 gms. of zinc dust were added in small portions. On cessation of the reaction the excess zinc was removed by filtration, and the filtrate was rendered ammoniacal with ammonium hydroxide at 10–15° C. The alkalinized material was extracted with six 50 mls. portions of chloroform. The chloroform extracts were concentrated to dryness. 0.96 gm. of methoxy-erysodine, in the form of a yellow gum, was obtained. The gum was dissolved in five mls. of absolute ethanol, and treated with 0.5 gm. of picric acid. Recrystallization from ethanol resulted in yellow crystals of M. P. 160–161° C.; (alpha)$_D^{25}$=+138.1, ethanol.

Anal. Calcd. $C_{19}H_{23}NO_3.C_6H_3N_3O_7$: C, 55.39; H, 4.83; 3 ($OCH_3$) 17.17. Found: C, 55.43; H, 4.70; 3 ($OCH_3$) 16.42.

*Example II*

0.2724 gm. of erysopine ($C_{17}H_{19}NO_3$; M. P. 240–242° C.; Jr. Amer. Chem. Soc. 62, 1681, 1940) was heated with 20 mls. of 30% hydrogen peroxide at 100° C. for 30 minutes. 32 mgms. of material did not dissolve and were removed by filtration. The filtrate was concentrated to dryness; 232 mgs. of erysopine amine oxide were obtained. It was dissolved in 50 mls. of 4% sodium hydroxide, five mls. of dimethyl sulfate were added, and the mixture was shaken vigorously for one hour. The alkaline material was extracted with eight 25 mls. portions of chloroform. The chloroform extracts were concentrated to dryness; 30.7 mgms. of residue were obtained. Further extraction of the mother liquor yielded 6.5 mgms. more residue. The combined concentrates (37.2 mgms. of methylated amine oxide) were dissolved in 25 mls. of dilute hydrochloric acid and three gms. of zinc dust were added in small portions. On completion of the reduction, the solution was filtered, and the filtrate was rendered ammoniacal with ammonium hydroxide. The alkaline solution was extracted with eight 25 mls. portions of chloroform. The chloroform extracts were concentrated to dryness. 14 mgms. of a clear gum were obtained. The extraction was repeated and 4 mgms. additional gum were obtained. The 18 mgms. of clear gum were dissolved in one ml. of absolute ethanol, and 15 mgms. of picric acid in one ml. of 95% ethanol were added. 14.1 mgms. of crude methoxy erysopine picrate were obtained. It was recrystallized from ethanol, and 10 mgms. of a product of M. P. 160° C. and (alpha)$_D^{25}$=+138.0, ethanol were obtained. This product was found to be identical with the methoxy-erysodine picrate of Example I.

*Example III*

0.2762 gm. of erysovine ($C_{18}H_{21}NO_3$; M. P. 177–179° C.; Jr. Amer. Chem. Soc. 62, 1681, 1940), was treated according to the process described in Example I. The picrate occurred in the form of yellow crystals of M. P. 160° C. and (alpha)$_D^{25}$=+137.0, ethanol; this product was found to be identical with the methoxy-erysodine picrate of Example I.

When these Erythrina alkaloids are reacted directly with dimethyl sulfate, without prior conversion to the corresponding amine oxide, a quaternary ammonium compound is formed. Thus, for example, when the Erythrina alkaloid erysodine was treated with dimethyl sulfate in sodium hydroxide, and worked up, analysis of the end product showed that the erysodine was methylated and a molecule of dimethyl sulfate added to the nitrogen atom. The product, dimethyl erysodine metho-sulfate occurred in the form of long, crystalline, very hygroscopic needles of M. P. 60° C.; empirical formula:

$$C_{19}H_{23}NO_3.(CH_3)_2SO_4.$$

Anal. Clcd. $C_{19}H_{23}NO_3.(CH_3)_2SO_4$: C, 57.39; H, 6.65; N, 3.16. Found: C, 57.47; H, 6.90; N, 3.15.

Modifications may be made in carrying out the present invention, without departing from the spirit and scope thereof, and we are to be limited only by the appended claims.

We claim:

1. The process for alkylating phenolic hydroxyl groups in alkaloids having at least one phenolic hydroxyl group and a trivalent nitrogen that comprises treating an alkaloid of the class described with an oxidizing agent to form the corresponding amine oxide, reacting the alkaloid amine oxide with an alkylating agent, reducing the alkylated alkaloid amine oxide thus formed, and recovering the alkylated alkaloid.

2. The process for alkylating phenolic hydroxyl groups in alkaloids having at least one phenolic hydroxyl group and a trivalent nitrogen that comprises treating an alkaloid of the class described with an oxidizing agent to form the corresponding amine oxide, reacting the alkaloid amine oxide with an alkylating agent in alkaline solution, reducing the alkylated alkaloid amine oxide thus formed, and recovering the alkylated alkaloid.

3. The process for alkylating phenolic hydroxyl groups in alkaloids having at least one phenolic hydroxyl group and a trivalent nitrogen that comprises treating an alkaloid of the class described with an oxidizing agent to form the corresponding amine oxide, reacting the alkaloid amine oxide with an alkylating agent, reducing the alkylated alkaloid amine oxide thus formed with zinc and dilute mineral acid, and recovering the alkylated alkaloid.

4. The process for alkylating phenolic hydroxyl groups in alkaloids having at least one phenolic hydroxyl group and a trivalent nitrogen that comprises treating an alkaloid of the class described with an oxidizing agent to form the corresponding amine oxide, reacting the alkaloid amine oxide with an alkylating agent in alkaline solution, reducing the alkylated alkaloid amine oxide thus formed with zinc and dilute mineral acid, and recovering the alkylated alkaloid.

5. The process for alkylating phenolic hydroxyl groups in alkaloids having at least one phenolic hydroxyl group and a trivalent nitrogen that comprises treating an alkaloid of the class described with an oxidizing agent to form the corresponding alkaloid amine oxide, reacting the alkaloid amine oxide with a dialkyl sulfate, reducing the alkylated alkaloid amine oxide thus formed, and recovering the alkylated alkaloid.

6. The process for alkylating phenolic hydroxyl groups in alkaloids having at least one phenolic hydroxyl group and a trivalent nitrogen that comprises treating an alkaloid of the class described with an oxidizing agent to form the corresponding alkaloid amine oxide, reacting the alkaloid amine oxide with a dimethyl sulfate, reducing the alkylated alkaloid amine oxide thus formed, and recovering the alkylated alkaloid.

7. The process for alkylating phenolic hydroxyl groups in alkaloids having at least one phenolic hydroxyl group and a trivalent nitrogen that comprises treating an alkaloid of the class described with an oxidizing agent to form the corresponding alkaloid amine oxide, reacting the alkaloid amine oxide with a dialkyl sulfate in alkaline solution, reducing the alkylated alkaloid amine oxide thus formed, and recovering the alkylated alkaloid.

8. The process for alkylating phenolic hydroxyl groups in alkaloids having at least one phenolic hydroxyl group and a trivalent nitrogen that comprises treating an alkaloid of the class described with an oxidizing agent to form the corresponding alkaloid amine oxide, reacting the alkaloid amine oxide with a dialkyl sulfate, reducing the alkylated alkaloid amine oxide thus formed with zinc and dilute mineral acid, and recovering the alkylated alkaloid.

9. The process for alkylating phenolic hydroxyl groups in alkaloids having at least one phenolic hydroxyl group and a trivalent nitrogen that comprises treating an alkaloid of the class described with an oxidizing agent to form the corresponding alkaloid amine oxide, reacting the alkaloid amine oxide with a dialkyl sulfate in alkaline solution, reducing the alkylated alkaloid amine oxide thus formed with zinc and dilute mineral acid, and recovering the alkylated alkaloid.

10. The process that comprises treating an Erythrina alkaloid, having a phenolic hydroxyl group and a trivalent nitrogen, with an oxidizing agent to form the corresponding amine oxide, reacting the amine oxide with an alkylating agent, reducing the alkylated Erythrina alkaloid amine oxide thus formed, and recovering the alkylated Erythrina alkaloid.

11. The process that comprises treating the Erythrina alkaloid, erysopine, with an oxidizing agent to form erysopine amine oxide, reacting the amine oxide with an alkylating agent, reducing the alkylated erysopine amine oxide thus formed, and recovering alkylated erysopine.

12. The process that comprises treating the Erythrina alkaloid, erysodine, with an oxidizing agent to form erysodine amine oxide, reacting the amine oxide with an alkylating agent, reducing the alkylated erysodine amine oxide thus formed, and recovering alkylated erysodine.

13. The process that comprises treating the Erythrina alkaloid, erysovine, with an oxidizing agent to form erysovine amine oxide, reacting the amine oxide with an alkylating agent, reducing the alkylated erysovine amine oxide thus formed, and recovering alkylated erysovine.

14. The fully methylated Erythrina alkaloid which has the empirical formula $C_{19}H_{23}NO_3$, and which forms a crystalline picrate salt melting at 160–161° C., $(\alpha)_D^{25} = +137$–138.1°.

KARL FOLKERS.
FRANK R. KONIUSZY.

REFERENCES CITED

The following references are of record in the file of this patent:

UNITED STATES PATENTS

| Number | Name | Date |
|---|---|---|
| 2,169,976 | Guenther et al. | Aug. 15, 1939 |

OTHER REFERENCES

Jour. Amer. Chem. Soc., vol. 62, pp. 1673–1683 (1940).

Jour. Amer. Chem. Soc., vol. 63, pp. 1544–1549 (1941).

Groggins: "Unit Processes in Organic Synthesis" (McGraw-Hill, New York, 1938), pages 517–520.